July 22, 1958 F. E. MONSLER 2,844,666

TELEPHONE HOLDERS

Filed June 7, 1954

INVENTOR.

Frank E. Monsler

BY Philip D. Friedell

Attorney

United States Patent Office 2,844,666

Patented July 22, 1958

2,844,666

TELEPHONE HOLDERS

Frank E. Monsler, Berkeley, Calif.

Application June 7, 1954, Serial No. 434,927

5 Claims. (Cl. 179—146)

This invention relates to means for supporting a telephone in a position where it is practically clear of the desk or table on which it is used, and so related to the person seated at the desk as to make dialing of the telephone simple, easy and convenient because of the position in which the telephone is supported with the dial in complete view.

The ordinary desk telephone is usually moved to any convenient spot on the table or desk, and if in the way, it is again moved to another position, and when it is to be used, it is brought up close so that the dial numbers can be seen plainly. Thus, in the course of events, the telephone is often moved from place to place, and forms an obstruction and takes up space which may be needed for the work at hand. The telephone cannot be dialed unless it is brought up close to the party making the call, since at any distance the letters and numbers are partly or completely concealed by the finger plate.

By the use of my invention, the telephone is located almost completely off the desk or table and is supported at a convenient angle, with a clear, unobstructed view of the dial numbers, for the operator. It maintains the telephone in a fixed position so that it will not move during the dialing operation, and it cannot be pushed off the desk or table onto the floor as sometimes happens with the present arrangement of merely moving the telephone around on the desk or table. The cord is always out of the way and therefore will not be brushing papers and other items onto the floor as at present when the telephone is moved from one place to another on the desk. The receiver is in the most convenient and favorable position for removal or replacement.

The objects and advantages of the invention are as follows:

First, to provide a support for supporting a telephone in a position substantially clearing the desk or table on which it is used.

Second, to provide a support as outlined which will fixedly support the telephone in a position providing a clear and unobstructed view of the dial numbers.

Third, to provide a support as outlined which will support the telephone in a position angularly related to both the top surface of the desk and the front edge, and facing the operator's position at the desk.

Fourth, to provide a support as outlined which is simple in construction, easy to install, and economical to manufacture.

In describing the invention reference will be had to the accompanying drawings, in which:

Fig. 1 is a perspective view of the telephone support and shown with a phantom image of a desk top and telephone.

Fig. 2 is a side elevation of the invention.

Fig. 3 is a front elevation.

Fig. 4 is a fragmentary top plan view of Fig. 2.

Fig. 5 shows one modification of the means for securing the support to a desk or the like.

Fig. 6 is a front view of Fig. 5.

Fig. 7 is a fragmentary side view showing another modification of the mounting means for desks and tables having plane side walls without any ledge.

Fig. 8 is a fragmentary front view of Fig. 7.

Figures 1, 2, 3, 4, 5, 6, 7, 8:
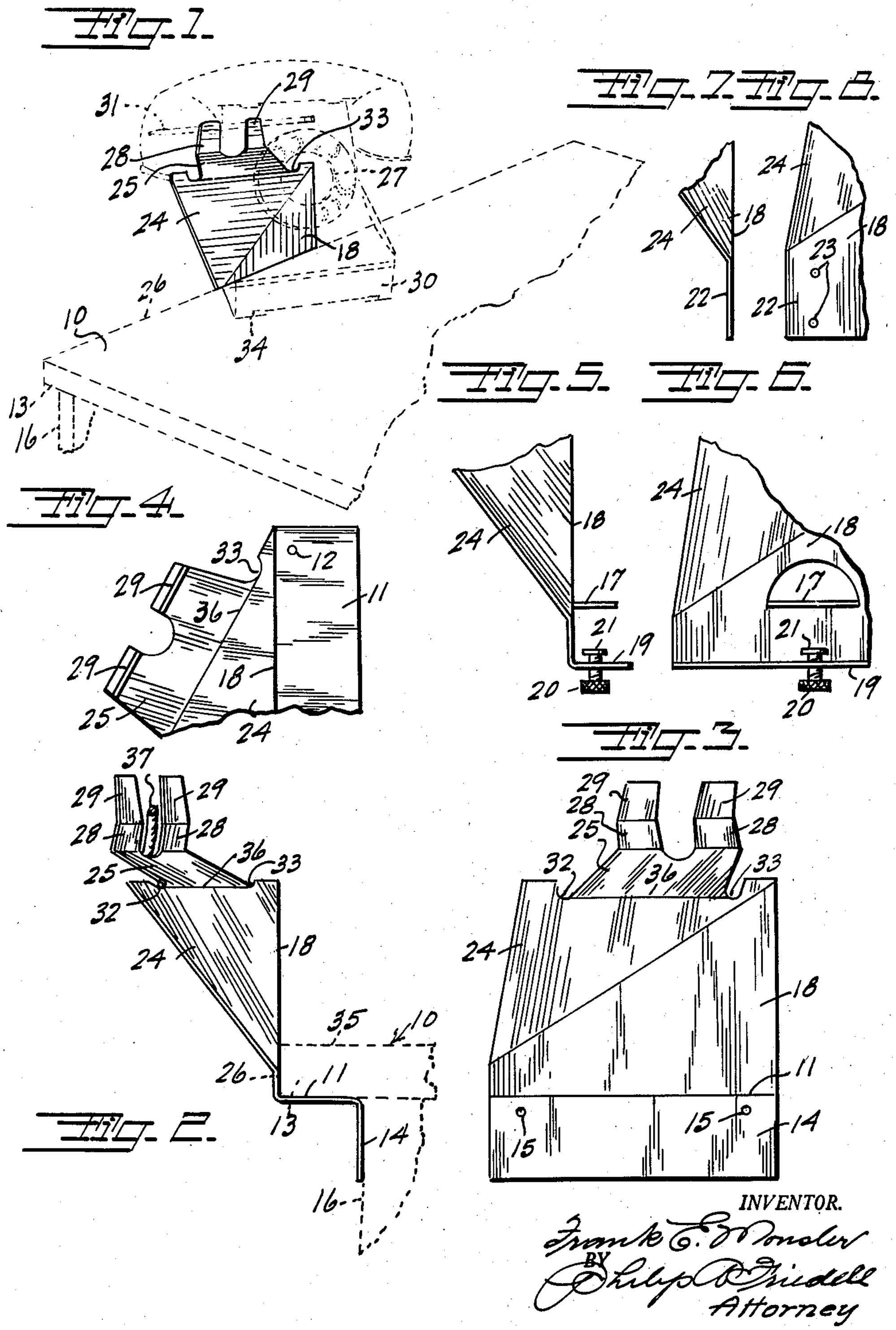

The invention consists of a bracket having attaching means for securing the bracket to one side of a table or desk, the type illustrated in Figs. 2, 3 and 4 being suitable for desk or table tops 10 which have side ledges, with the horizontal portion 11 having suitable holes 12 for screwing to the underside of the ledge 13, and the depending portion 14 also having suitable holes 15 for attaching the bracket to the side walls 16 by means of screws or bolts. Either or both may be used, as may prove most desirable.

The modification illustrated in Figs. 5 and 6 is suitable only for desks or tables having a ledge, the top clamp member 17 being blanked and formed out from the front wall 18 of the bracket. The lower end of the front wall is formed forwardly at right angles as indicated at 19 and is provided with a clamp screw 20 by which the ledge is clamped between the member 17 and the screw foot 21.

The modification shown in Figs. 7 and 8 is suitable for desks and tables which have no ledge, the edge of the top being flush with the side wall of the desk or the like. The portion 22 is merely a depending extension of the front wall 18 and is provided with suitable holes 23 for attachment to the side wall by means of screws or bolts.

The front wall is angled as shown at 24 to clear the underside of the telephone base and so as to provide for forming the supporting ledge 25 for the rear end of the telephone base at an angle of approximately 30 degrees to the side edge 26 of the desk, this 30 degree angle having been found the most convenient with the most direct viewing of the dial 27 of the telephone from the operator's position in front of the desk. However, this angle may be varied to suit other positions along the side of the desk when desired.

The support extension or ledge 25 terminates at its rearward end in perpendicularly formed stops 28 which continue into rearwardly projecting angular ears 29, the members 28 cooperating with the back end of the telephone to prevent shifting of the front end 30 on the desk, while the ears form a holder for a pencil 31 in cooperation with the back of the telephone, and the space between the ears and stops provides a passage and retainer for the telephone cord.

Recesses 32 and 33 are provided to cooperate with the cushion feet 34 at the back end of the telephone base and are formed at the juncture of the slanted portion of the front wall and the support ledge, this support ledge being formed at an angle of approximately 24 degrees to the horizontal or the top surface of the desk so as to accommodate either the standard or executive type telephone, the latter having a longer base.

The height of the front wall 18 from the top 35 of the desk to the break line 36 is made approximately .4 to .5 of the length of the base of the telephone so as to set the telephone at an angle of approximately 30 degrees to the plane of the top of the desk, in which position along with angling in the direction of the operator at an angle of approximately 30 degrees, the telephone is placed in the most convenient position for dialing with the dial in direct full view, and the receiver in the most convenient position for removal and replacement.

With the cushion feet on the back end of the telephone engaged in the recesses 32 and 33 and with the back of the telephone against the perpendicular members 28, the telephone cannot shift during dialing, the cord 37 is entirely clear of the desk top so that it cannot sweep papers or other items off the desk, and the telephone is supported in a position almost entirely off the desk leaving substantially the entire desk top free and unobstructed.

Obviously, the telephone can be removed from the support at will by merely lifting it from the support, the holding means residing merely in the cushion feet and back of the telephone in cooperation with the perpendicular members 28 and the recesses 32 and 33.

I claim:

1. Means for holding and positioning a telephone having a base having a rearward portion having cushion feet, a telephone dial and a telephone cord, on a desk or the like having a side and a top surface, comprising a bracket having means for attachment to the side of a desk or the like and having an upwardly and outwardly inclined support portion for the rearward portion of the base of the telephone and including spaced recesses provided in the outer edge of the inclined support portion for reception of the cushion feet at the rear end of the base for retaining the telephone in predetermined position, said inclined portion terminating at its outer end in back stops formed perpendicular to the inclined portion for the base, whereby the telephone is supported and retained in an angular position for direct visibility and accessibility of the telephone dial.

2. A structure as defined in claim 1; said inclined portion being formed at an angle of approximately 25 degrees to the horizontal and inclined upwardly and outwardly and said recesses being located on an axis approximately 30 degrees relative to the side of the desk or the like, and located at an elevation equal to about one-half the length of the telephone base above the top surface of the desk or the like.

3. A structure as defined in claim 1, said stops comprising two spaced perpendicular extensions continuing from the outer end of said inclined support portion and terminating in upwardly and outwardly inclined portions with the space therebetween providing clearance for the telephone cord.

4. Means for holding and positioning a telephone on a desk or the like having a side, a front edge and a top, said telephone having a front end, a back, a base having cushion feet, and a telephone cord, comprising a bracket having its lower end attachable to the side of a desk or the like and having a support portion inclined upwardly and outwardly in a position approximately one-half the length of the telephone base above the top of the desk and formed with its rear edge at an angle of approximately 30 degrees relative to the side of the desk and having engaging means for the rear cushion feet of the telephone for retaining the telephone in predetermined position at an angle of approximately 30 degrees relative to the front edge of the desk, with the front end of the telephone supported on the top of the desk, for supporting the telephone.

5. A structure as defined in claim 4; said support portion having perpendicular stop members projecting upwardly from the rear end thereof for cooperation with the back of the telephone when the cushion feet are engaged by said engaging means, and spaced apart for passage of the telephone cord.

References Cited in the file of this patent

UNITED STATES PATENTS 2,535,330 Stone ---------------- Dec. 26, 1950